US012522491B2

(12) United States Patent
Fung et al.

(10) Patent No.: US 12,522,491 B2
(45) Date of Patent: Jan. 13, 2026

(54) LIFT DEVICE AND METHOD OF CONTROLLING ON A GRADE

(71) Applicant: Terex South Dakota, Inc., Watertown, SD (US)

(72) Inventors: Zachary Fung, Kirkland, WA (US); Giulio Dall'anese, Perugia (IT); Pietro Sanchirico, Corciano (IT); Mark Case, Watertown, SD (US); Brian M. Clark, Seattle, WA (US)

(73) Assignee: Terex South Dakota, Inc., Watertown, SD (US)

( * ) Notice: Subject to any disclaimer, the term of this patent is extended or adjusted under 35 U.S.C. 154(b) by 992 days.

(21) Appl. No.: 17/475,788

(22) Filed: Sep. 15, 2021

(65) Prior Publication Data

US 2023/0079946 A1 Mar. 16, 2023

(51) Int. Cl.
*B66F 17/00* (2006.01)
*B60L 7/18* (2006.01)
*B60L 53/00* (2019.01)
*B60T 7/12* (2006.01)
(Continued)

(52) U.S. Cl.
CPC .............. *B66F 17/006* (2013.01); *B60L 7/18* (2013.01); *B60L 53/00* (2019.02); *B60T 7/12* (2013.01); *B66F 11/044* (2013.01); *F15B 15/202* (2013.01); *B60L 2200/40* (2013.01)

(58) Field of Classification Search
CPC .. B66F 17/006; B66F 11/044; B66F 9/07504; B66F 9/07509; B66F 11/042; B60L 7/18; B60L 53/00; B60L 2200/40; B60T 7/12; F15B 15/202
See application file for complete search history.

(56) References Cited

U.S. PATENT DOCUMENTS

| 5,388,400 | A | 2/1995 | Hoppenstedt et al. |
| 5,992,562 | A | 11/1999 | Boeckman et al. |
| 8,844,660 | B2 | 9/2014 | Kawashima et al. |

(Continued)

FOREIGN PATENT DOCUMENTS

| DE | 10056553 A1 | 5/2001 |
| DE | 102015111926 A1 | 1/2017 |

(Continued)

OTHER PUBLICATIONS

International Search Report and Written Opinion for PCT Application No. PCT/US21/62316, dated Feb. 24, 2022, 9 pages.

(Continued)

*Primary Examiner* — Hoang M Nguyen
(74) *Attorney, Agent, or Firm* — Brooks Kushman P.C.

(57) ABSTRACT

A lift device and a method of controlling the lift device are provided. The lift device has a lifting mechanism supporting a lifting platform relative to the chassis. An electric motor is drivingly coupled to a traction device, and a traction battery is in electrical communication with the electric motor. A user input is provided to control a speed of the lift device by inputting a requested speed. A controller is configured to, in response to the lift device being on a non-zero grade and if the requested speed is greater than a predetermined speed, command the electric motor to output a braking torque and provide electrical power to the traction battery, and limit the speed of the lift device to the predetermined speed.

20 Claims, 5 Drawing Sheets

(51) Int. Cl.
   *B66F 11/04* (2006.01)
   *F15B 15/20* (2006.01)

(56) References Cited

U.S. PATENT DOCUMENTS

| | | | |
|---|---|---|---|
| 9,238,477 | B2 | 1/2016 | Ahern et al. |
| 10,167,181 | B2 | 1/2019 | Xu |
| 10,270,265 | B2 | 4/2019 | Owen et al. |
| 10,611,204 | B1 | 4/2020 | Zhang et al. |
| 11,447,020 | B2 * | 9/2022 | Lombardo ............... B60L 7/10 |
| 2004/0124020 | A1 | 7/2004 | Leifert |
| 2009/0008175 | A1 | 1/2009 | Donaldson |
| 2010/0186404 | A1 | 7/2010 | Yasufuku et al. |
| 2011/0198141 | A1 | 8/2011 | Clark et al. |
| 2015/0210520 | A1 | 7/2015 | Ahern et al. |
| 2015/0275798 | A1 | 10/2015 | Kato et al. |
| 2017/0081162 | A1 | 3/2017 | Ahern et al. |
| 2017/0314233 | A1 | 11/2017 | Egawa et al. |
| 2018/0056790 | A1 * | 3/2018 | Symanow ............... B60L 7/16 |
| 2019/0193507 | A1 | 6/2019 | Kral et al. |
| 2020/0239000 | A1 | 7/2020 | Chen et al. |
| 2020/0317488 | A1 | 10/2020 | Bafile et al. |
| 2021/0114464 | A1 * | 4/2021 | Carbone ............... B60L 7/26 |
| 2023/0077831 | A1 * | 3/2023 | Clark ............... B66F 11/044 182/2.9 |

FOREIGN PATENT DOCUMENTS

| | | |
|---|---|---|
| EP | 2135838 A1 | 12/2009 |
| EP | 2705977 A2 | 3/2014 |
| EP | 3127855 A1 | 2/2017 |
| EP | 3868700 A1 | 8/2021 |
| JP | H0592769 A | 4/1993 |
| JP | H08256401 A | 10/1996 |
| JP | 2000038299 A | 2/2000 |
| JP | 2001139295 A | 5/2001 |
| JP | 2001146400 A | 5/2001 |
| JP | 2004120999 A | 4/2004 |
| JP | 2006273516 A | 10/2006 |
| JP | 2008280178 A | 11/2008 |
| JP | 2011016615 A | 1/2011 |
| JP | 2014156307 A | 8/2014 |
| JP | 2015063847 A | 4/2015 |
| JP | 2016524892 A | 6/2016 |
| JP | 2017178142 A | 10/2017 |
| JP | 6794928 B2 | 12/2020 |
| JP | 2021080788 A | 5/2021 |
| WO | 2019119021 A1 | 6/2019 |

OTHER PUBLICATIONS

International Preliminary Report on Patentability for Application No. PCT/US2021/065420, dated Mar. 28, 2024 12 pages.
International Preliminary Report on Patentability for Application No. PCT/US2021/062316, dated Mar. 28, 2024, 8 pages.
International Search Report and Written Opinion for Application No. PCT/US21/65420, mailed Mar. 24, 2022, 14 pages.
Extended European Search Report for Application No. EP21957705.3, dated Jul. 10, 2025, 11 pages.
Notice of Allowance for U.S. Appl. No. 17/475,626, dated Apr. 29, 2025, 11 pages.
Non-Final Office Action For U.S. Appl. No. 17/475,626, dated May 27, 2025, 14 pages.
Extended European Search Report for Application No. 21957706.1, dated Jul. 22, 2025, 9 pages.
Japan Office Action and English translation for Application No. 2024-516562, dated Nov. 4, 2025, 10 pages.
Japan Office Action and English translation for Application No. 2024-516680, dated Nov. 11, 2025, 11 pages.

* cited by examiner

LIFT DEVICE AND METHOD OF CONTROLLING ON A GRADE

TECHNICAL FIELD

Various embodiments relate to a lift device or utility vehicle with an electric drivetrain and controlling the lift device on a grade.

BACKGROUND

A lift device with an electric driveline may use regenerative braking from a traction motor to recharge a traction battery. When the lift device is traveling downhill over a grade, the traction motors may provide braking to slow the vehicle. As the traction motors have an associated braking torque limit, the traction motors may be unable to control the vehicle to a commanded speed depending on the speed of the lift device and the grade, which may cause the vehicle speed to increase above the requested or commanded speed, or may cause the parking brake to be abruptly set.

SUMMARY

In an embodiment, a lift device is provided with a chassis, a lifting mechanism supporting a lifting platform relative to the chassis, and a plurality of traction devices to support the chassis on an underlying surface. An electric motor is drivingly coupled to at least one of the plurality of traction devices, and a traction battery is in electrical communication with the electric motor. A user input is provided to control a speed of the lift device by inputting a requested speed. A controller is configured to, in response to the lift device being on a non-zero grade and if the requested speed is greater than a predetermined speed, command the electric motor to output a braking torque and provide electrical power to the traction battery, and limit the speed of the lift device to the predetermined speed.

In another embodiment, a method of controlling a lift device is provided. A requested speed for the lift device is received from a user input. The lift device is propelled at the requested speed via an electric motor connected to a wheel, with the electric motor electrically connected to a traction battery. The requested speed is determined to be greater than a predetermined speed when the lift device is on a grade, with the predetermined speed being dependent on the grade. A speed of the lift device is limited to the predetermined speed by commanding the electric motor to output a braking torque and provide electrical power to the traction battery while the lift device is on the grade. A parking brake is commanded to engage to stop the lift device if the speed of the lift device exceeds the predetermined speed while on the grade.

In an embodiment, a propulsion device is provided with an electric motor adapted to be coupled to at least one wheel, a traction battery in electrical communication with the electric motor, and a user input to control a speed of the at least one wheel by inputting a requested speed. A controller is configured to, in response to the device being on a non-zero grade and if the requested speed is greater than a predetermined speed, command the electric motor to output a braking torque and provide electrical power to the traction battery, and limit the speed of the device to the predetermined speed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
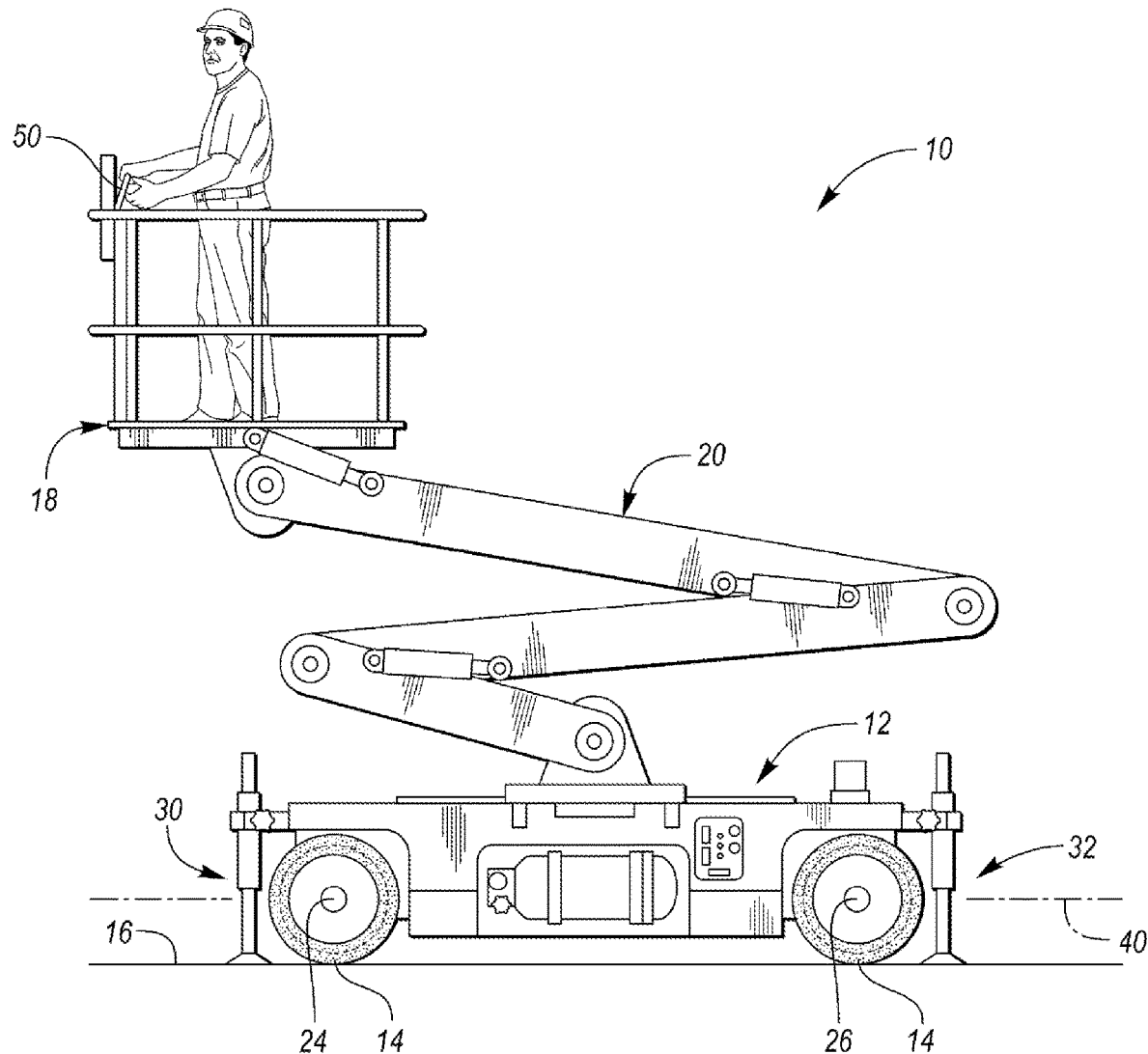
FIG. 1 illustrates a perspective view of a lift device according to a first embodiment.

FIG. 1 illustrates a lift device 10 or utility vehicle 10 according to a first embodiment and for use with the present disclosure. Lift devices or utility vehicles are used in a commercial or industrial environment and may include lift equipment, including a portable material lift, aerial work platform, telehandler, scissor lift, rough terrain telescopic load handler, and telescopic and articulating boom. In FIG. 1, the lift device 10 is illustrated as a telescopic and articulating boom according to a non-limiting example.

The lift device 10 has an electric propulsion system that acts to propel the vehicle, as described below with respect to FIG. 3. The lift device 10 also has an electrically or hybrid powered hydraulic system that operates the work function, such as a lift platform, of the lift device as well as other vehicle systems such as steering, and is described below with respect to FIG. 4. Alternatively, the work function may be solely electrically powered, e.g. without use of a hydraulic system or circuit.

The lift device 10 has a base 12 or a chassis 12 that is supported above underlying terrain by a plurality of traction devices 14, such as four wheels 14. The lift device 10 is configured for lifting a load, such as a person, tools, cargo, and the like, with respect to a support surface 16 or the underlying terrain, such as paved or unpaved ground, a road, an apron such as a sidewalk or parking lot, an interior or exterior floor of a structure, or other surfaces.

The lift device 10 includes a vehicle lift component 18 such as a platform, a base or chassis 12, and a support assembly 20 that couples the platform 18 and the base 12. The base 12 is supported on the support surface 16 by traction devices 14, such as wheels. The traction devices 14 may include tires and/or tracks. The vehicle 10 has a first axle 24 with two wheels 14 and a second axle 26 with another two wheels 14. Axle 24 may be a front axle, and axle 26 may be a rear axle. In other embodiments, the vehicle 10 may have more than two axles. In other embodiments, traction devices 14 may be aligned with one another along a lateral axis of the vehicle, but not have axles 24, 26 extending between them.

The support assembly 20 may include one or more actuators, such as hydraulic actuators as described below, along with other structural members, to provide a lifting mechanism for the platform 18.

The base 12 has first and second opposite sides or ends 30, 32 that correspond to the front and the rear ends of the base and vehicle, respectively. The vehicle 10 is configured to move in both a forward and a reverse direction, e.g., in either direction along a vehicle longitudinal axis 40 depending on the direction that the wheels 22 are rotating.

The operator for the lift device 10 inputs commands to the lift device via an operator input or user input 50, e.g., on a control panel. The operator input 50 may include a joystick to input speed and direction commands for the lift device 10. For example, forward movement of the joystick relative to its neutral, center position provide a forward speed command for the vehicle, e.g., the vehicle moves in a forward direction, or to the left in FIG. 1, at a selected speed. Reverse movement of the joystick relative to its neutral center position provides a reverse speed command for the vehicle, e.g., the vehicle moves in a rearward or reverse direction, or the right in FIG. 1, at a selected speed. The magnitude of the speed command is based on the distance between the actual joystick position and the neutral central position.

The control panel 50 may additionally have an operator input for selection of a speed mode for the device 10. In one example, the lift device 10 has three speed modes, with each speed mode having a different maximum speed for the lift device. The first speed mode has the highest maximum speed and is used when the lifting platform is stowed, the second speed mode has a lower maximum speed mode and is also used when the lifting platform is stowed, and the third speed mode has the lowest maximum speed and is used when the lifting platform is deployed from the stowed position. The joystick may be recalibrated based on the mode, such that the full forward position of the joystick provides the maximum speed allowed for that mode, and likewise for the full back or rear position.

In one example, the first speed mode allows for vehicle 10 speeds ranging from zero to twenty miles per hour in either direction, the second speed mode allows for vehicle speeds ranging from zero to five miles per hour in either direction, and the third speed mode allows for vehicle speeds ranging from zero to two miles per hour in either direction. In another example, the first speed mode allows for vehicle 10 speeds ranging from zero to four miles per hour in either direction, the second speed mode allows for vehicle speeds ranging from zero to two miles per hour in either direction, and the third speed mode allows for vehicle speeds ranging from zero to less than one miles per hour in either direction.

The system controller may additionally select the speed mode for the device based on the operating conditions, and may override the operator selection via input 50.

The control panel 50 also provides for other operator inputs, such as controlling the position of the lift component 18 relative to the base 12. Furthermore, the control panel 50 may include a display screen, indicator lights, and the like to provide information to the operator regarding the lift device 10.

Figure 2:
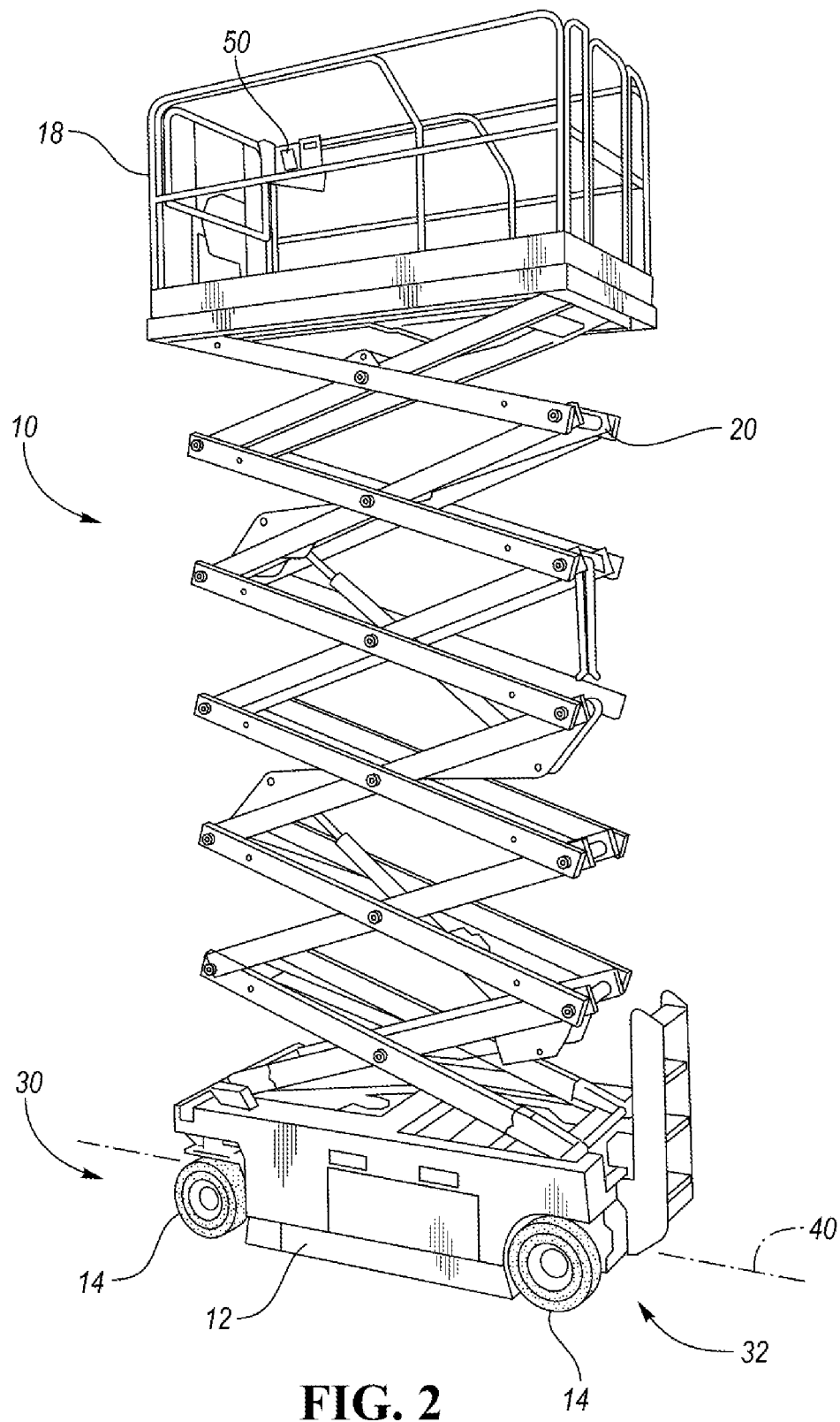
FIG. 2 illustrates a perspective view of a lift device according to a second embodiment.

FIG. 2 illustrates a lift device 10 according to another embodiment and for use with the present disclosure. Elements that are the same as or similar to those described above with respect to FIG. 1 are given the same reference number for simplicity. In FIG. 2, the lift device 10 is illustrated as a scissor lift according to another non-limiting example.

Figure 3:
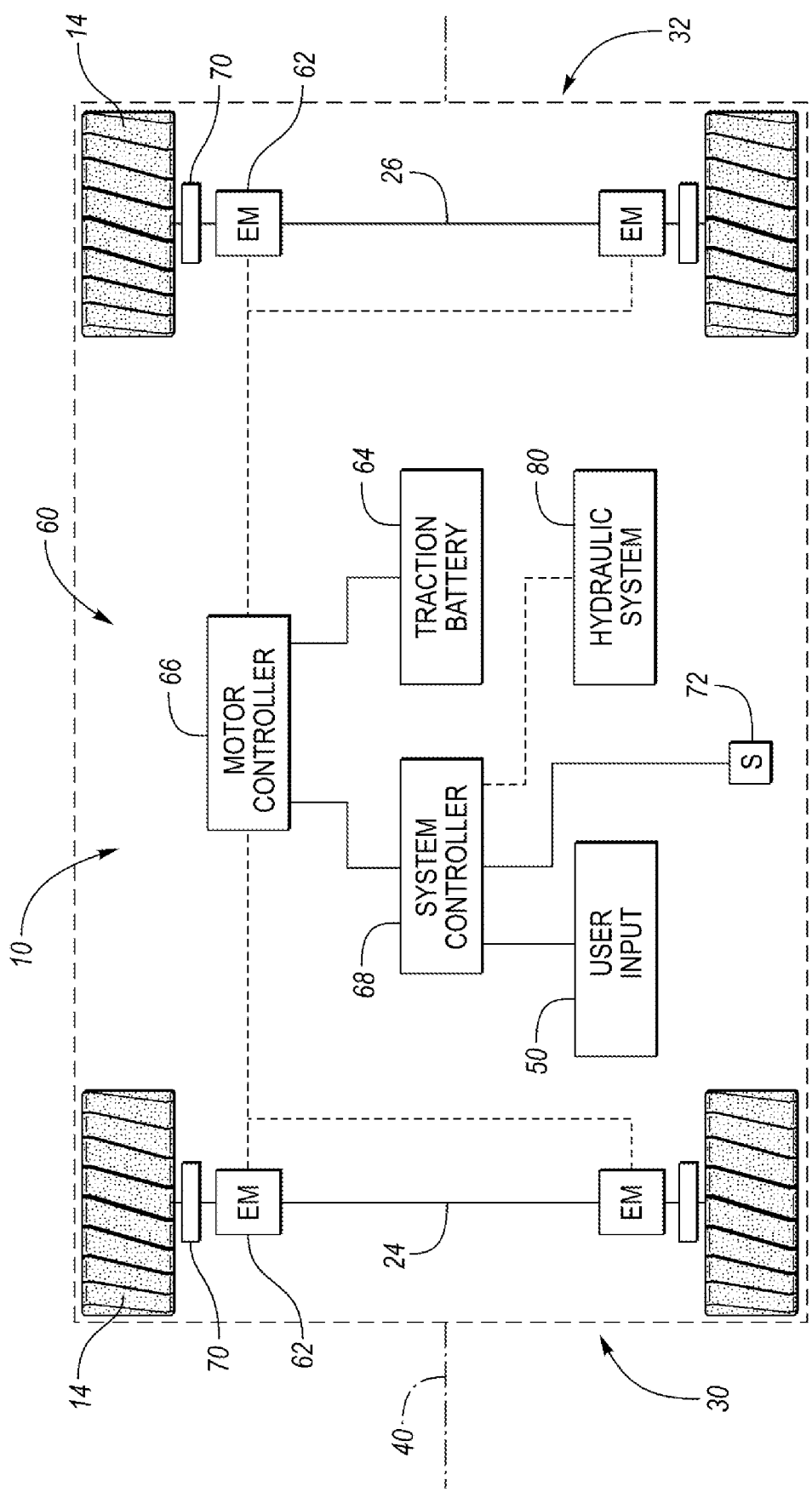
FIG. 3 illustrates a schematic for the lift device of FIG. 1 or FIG. 2.

FIG. 3 illustrates a schematic for the lift device 10 of FIG. 1 or FIG. 2, or another lift device such as a forklift, or the like. Elements that are the same as or similar to those described above with respect to FIG. 1 are given the same reference number for simplicity.

The lift device 10 has a plurality of traction devices 14. In one example, the traction devices 14 are provided by wheels, and the lift device 10 has four wheels as shown above with respect to FIGS. 1 and 2. In other examples, the lift device 10 may have more than four wheels.

The lift device 10 has an electric propulsion system 60. The electric propulsion system 60 includes one or more electric motors 62 that are drivingly connected to at least one of the plurality of traction devices 14 to propel the lift device over underlying terrain. In one example, the electric motors 62 are provided as hub motors for two or more of the wheels 14. In a further example, and as shown, the electric propulsion system 60 has four electric motors 62 that are provided as hub motors for the four wheels 14. In other examples, the electric motors 62 may be connected to more than one wheel, e.g., via a differential in a driveline. Alternatively, only some of the wheels 14 provide tractive force for the vehicle, e.g., as two wheel drive.

Each electric motor 62 is connected to a traction battery 64 via an associated motor controller 66. The motor controller 66 controls the speed and torque of each of the electric motors 62, and the motors 62 may be independently controlled. The motor controller 66 is shown as a single integrated element, but may be provided as a separate element for each motor 62. The motor controller 66 voltage may be equivalent to the voltage of the traction battery 64. The motor controller 66 has an associated voltage limit. Each of the motor controllers 66 are in communication with a system controller 68. The control panel 50 and operator inputs, such as the joystick, are also in communication with the system controller 68.

The traction battery 64 may be provided by one or more cells, may be a wet cell or a dry cell, and may be formed with a lead acid chemistry, lithium based chemistry, or another chemistry. The traction battery 64 may have an associated voltage limit, current limit, state of charge limit, or temperature limit. In one non-limiting example, the motor controller 66 has a voltage limit. In another example, and with a lithium chemistry battery, the battery 64 may have voltage and current limits, as well as operating temperature limitations. For example, the battery 64 may have limited charging when it is outside a temperature range, e.g., after a cold start at cold ambient temperatures, and the motor controller 66 and/or system controller 68 may limit charging of the battery in these conditions.

The system controller 68 is in communication with the various propulsion and hydraulic components and sensors to control the device 10. The controller 68 may provide or be a part of a vehicle systems controller (VSC), and may include any number of controllers, and may be integrated into a single controller, or have various modules. Some or all of the controllers may be connected by a controller area network (CAN) or other system. The controller may also be connected to random access memory or another data storage system.

In various examples, the device 10 has a sensor 72 supported by the chassis 12 and in communication with the controller 68. The sensor 72 may be used to determine tilt of the device 10 during static conditions, e.g. to limit deploying the lifting platform based on the slope or grade. The sensor 72 may be an electronic tilt sensor that is provided by a multi-axis accelerometer sensor that reports pitch and roll angle, or horizontal acceleration vectors, to the controller 68. The multi-axis accelerometer sensor 72 may include solid state accelerometers to infer the tilt of the chassis 12 and device 10.

In another example, the sensor 72 is a multi-axis inertial sensor, which may measure and report the true slope or grade to the controller.

The motor controller 66 may control the electric motor 62 on a speed control feedback loop based on the speed input from the operator. For example, the operator may input a selected speed via the joystick 50, and the motor controller 66 may control or modulate torque of the electric motor 62 to provide the desired speed output based on the operator request. Therefore, to reduce a speed of the traction motor 62, the motor controller 66 may command the traction motor to output a reduced torque or a torque of the opposite direction to the motor rotation, e.g., as a braking torque. The traction motors 62 may be provided as four quadrant motors that are controllable between forward braking, forward motoring, reverse motoring, and reverse braking.

Additionally, the traction battery 64 may be externally charged, e.g., via an electrical input from an external power source such as a charging station.

Each electric motor 62 may be controlled to rotate in a first direction and in a second direction, and additionally has the speed and torque outputs controlled. The electric motor 62 may therefore propel the vehicle across the underlying terrain with a positive torque output. The electric motors 62 may additionally act as a generator to provide a negative torque output to brake or slow the vehicle, and provide electrical power to the traction battery 64.

In the example shown, the lift device 10 is provided without a service braking system. As such, the electric motors 62 are the only devices that apply a braking force to the wheels 14 to control vehicle speed while driving. A service braking system is conventionally provided by drum brakes, disc brakes, or the like that provide for a controlled braking input by an operator, e.g., to slow the vehicle to a lower speed.

In the example shown, the lift device 10 has a parking brake system. In the parking brake system, a parking brake 70 is provided at each wheel 14. In one non-limiting example, the parking brake 70 is integrated into the traction motor 62 and wheel 14 drive assembly, and may be provided as a spring applied, coil released brake, e.g. as a disc brake. The controller 68 or operator may actuate the parking brakes 70 to stop the lift device 10, or release the parking brakes 70 to allow the lift device 10 to move relative to the underlying terrain. When the parking brakes 70 are actuated or set when the device 10 is in motion, the wheels 14 do not rotate, and the lift device 10 skids to a stop.

On the electrical propulsion lift device 10 as described above with respect to FIGS. 1-3, the traction motors 62 may provide both propulsion torque and braking torque in both forward and reverse directions. When these motors 62 are moving the device forward using positive torque, the traction battery 64 is discharged to provide the electrical power. When these traction motors 62 are slowing the vehicle down by braking, the battery current direction is reversed and the braking power charges the battery 64, e.g., via regenerative braking.

Figure 5:
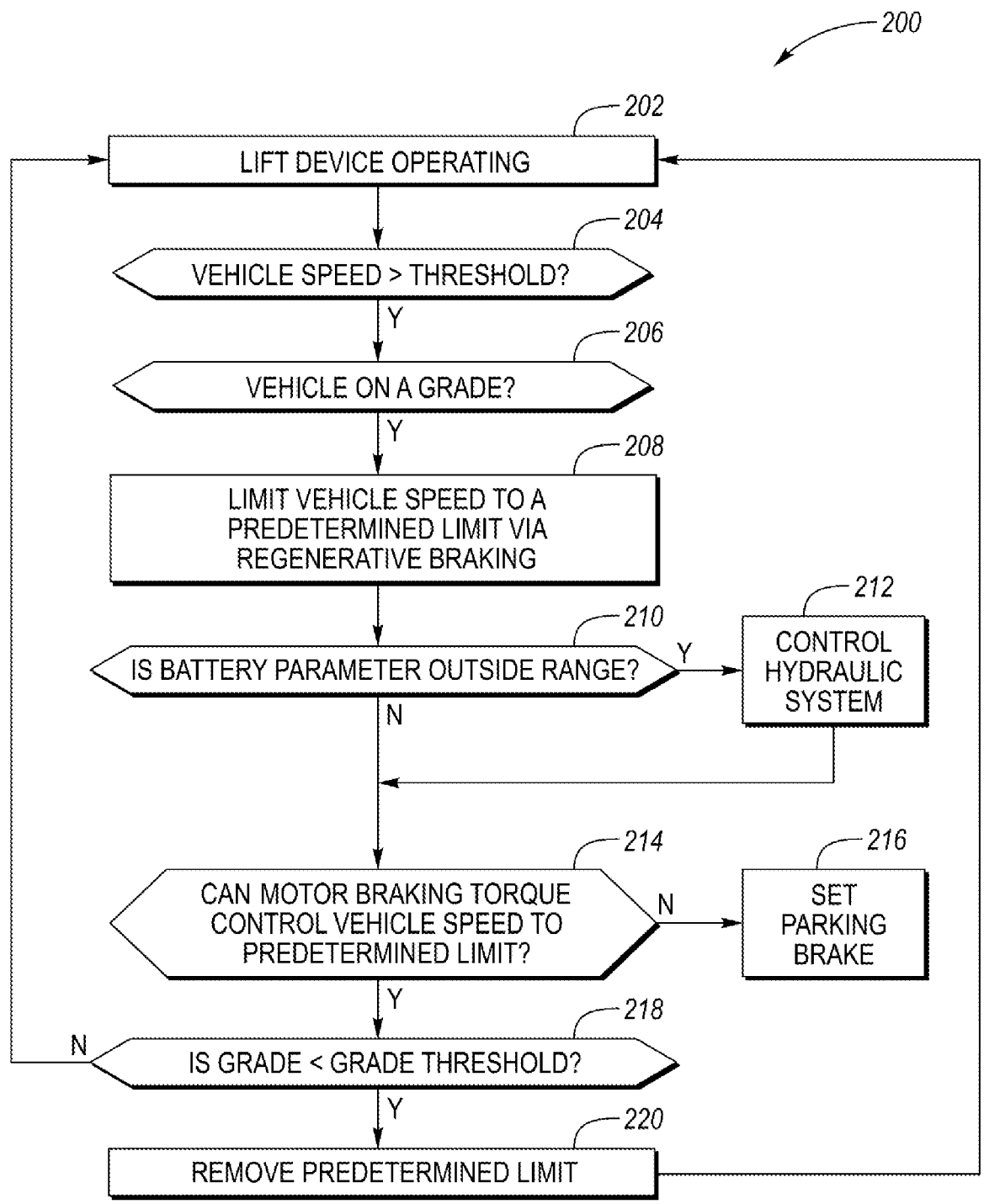
FIG. 5 is a flow chart illustrating a method of controlling a lift device according to an embodiment.

Charging, e.g., via regenerative braking, results in increased voltage at the traction battery 64. Depending on the size and chemistry of the battery 64 as well as the braking power applied, the battery 64 voltage may rise significantly. Although this voltage increase may be temporary, the motor controller 66, the traction battery 64, and/or other on-board power electronics devices may have associated voltage limits or current limits. For example, a three-phase motor controller 66 may have an associated voltage threshold, and the motor 62 torque under braking may be limited when this threshold is reached. This, in turn, may limit the ability of the traction motor 62 to brake and control vehicle 10 speed, e.g., on grade, which may result in unintended acceleration downslope for the device 10 and/or a lift device speed above the requested speed or commanded speed. The method as described below with respect to FIG. 5 provides for control of the lift device 10 during such a scenario.

Figure 4:
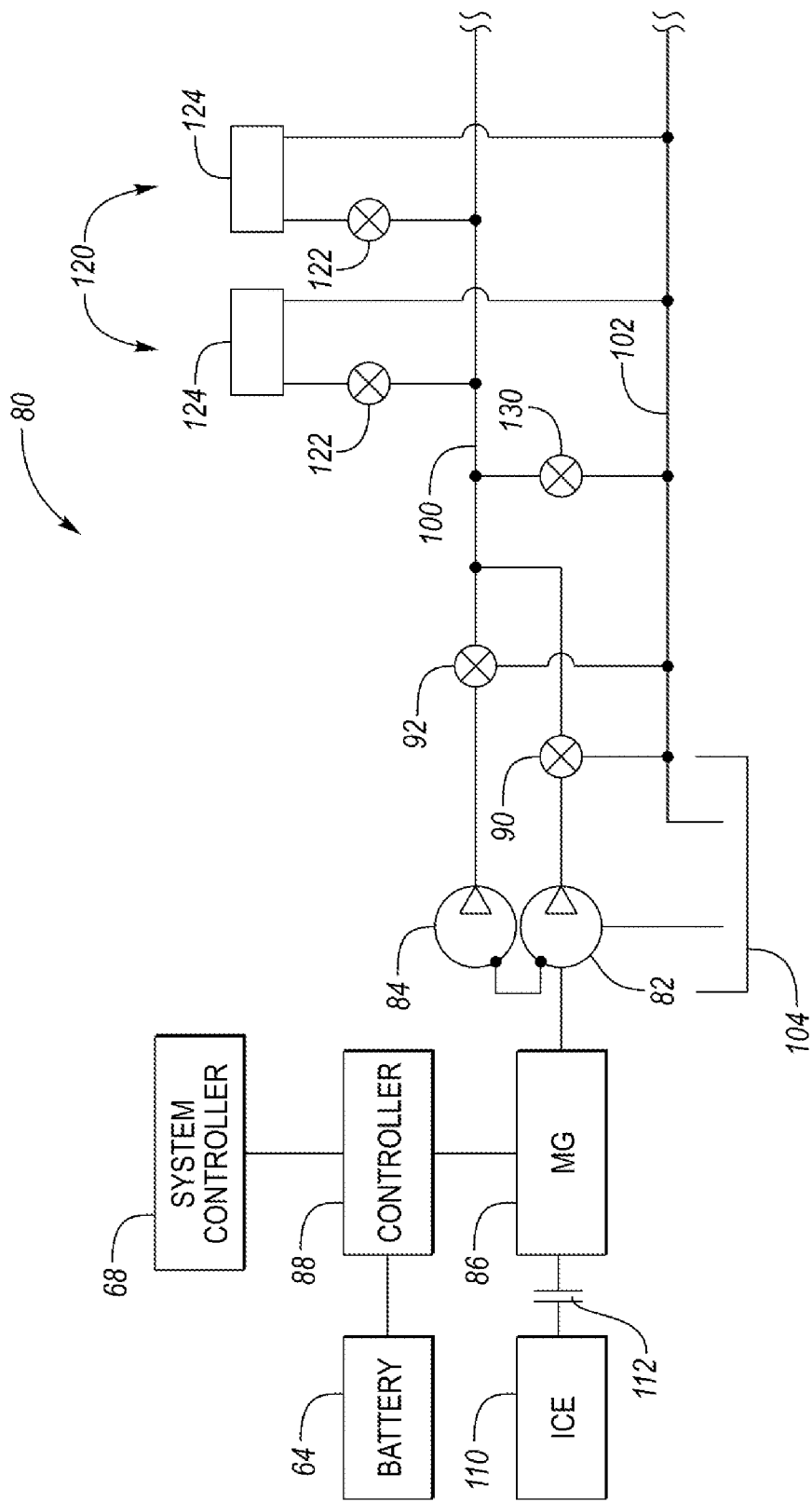
FIG. 4 illustrates a hydraulic schematic for the lift device of FIG. 1 or FIG. 2.

FIG. 4 illustrates a hydraulic schematic for the lift device 10 of FIG. 1 or FIG. 2 according to an example, and when the device is equipped with a hydraulic system 80. The hydraulic system 80 may be a hydraulic circuit with a closed loop system or an open loop system. In the example shown, the hydraulic system has two pumps 82, 84, with the second pump 84 piggybacked to the first pump 82. Alternatively, a single pump housing may be provided with the housing sectioned two provide two pump 82, 84 volumes. The first and second pumps 82, 84 are driven by a pump motor 86, which is an electric motor that is electrically coupled to the traction battery 64 described above with reference to FIG. 3 via a pump motor controller 88. The speed of the pump motor 86 may be controlled to control the flow from the pumps 82, 84. As used herein, flow from the pumps 82, 84 may be controlled by controlling a speed of the pumps and/or a displacement from the pumps or via the pump valves 90, 92.

In alternative examples, the hydraulic system may have a single pump, such as pump 82, that is driven by the pump motor.

The pumps 82, 84 may be provided as variable displacement pumps. Alternatively, and as shown, each pump 82, 84 may have an associated pump valve 90, 92 that fluidly connects the associated pump to the pressure galley 100 or to the return line 102 and tank 104. Therefore, displacement or flow to the pressure galley 100 may be controlled by selectively controlling the first and/or second pump valves 90, 92 to provide flow to the pressure galley 100. Displacement or flow to the pressure galley 100 may be further controlled within a range provided by the pump valves 90, 92 in selected positions by selectively controlling the speed of the pump motor 86.

In various examples, and as shown, the hydraulic system 80 additionally has an internal combustion engine 110, such as a diesel engine or gasoline engine that is coupled to the pump motor 86 via an overrunning clutch 112. The pump motor 86 is therefore positioned between the engine 110 and the pumps 82, 84. The engine 110 and/or the pump motor 86 may be operated to drive the pumps 82, 84. The overrunning clutch 112 engages to mechanically couple the engine 110 and the pump motor 86 to one another when the rotational speed of the engine 110 output shaft is equal to or less that the rotational speed of the pump motor 86 shaft. Therefore, the overrunning clutch 112 is disengaged, and the pump motor 86 operates independently of the engine 110 when the pump motor speed is greater than the engine speed.

In other examples, the hydraulic system 80 may be only electrically powered, such that there is no engine or overrunning clutch, and only the pump motor 86 rotates the pump(s).

The engine 110, pump motor controller 88, and selected valves are also in communication with the vehicle controller 68.

The first and second pumps 82, 84 provide pressurized fluid flow to a pressure galley 100. The hydraulic functions 120 for the lift device 10 are connected to the pressure galley 100 to receive pressurized fluid therefrom, e.g., via valves 122. For example, hydraulic actuators 124 for the support assembly of the lift platform, steering of the wheels, axle control, and other device functions are fluidly coupled to the pressure galley 100. The hydraulic actuators 124 are also coupled to a return line 102, which is downstream of the pressure galley 100 and actuators 124. The return line 102 provides a fluid pathway to the tank 104 and the pumps 82, 84 from the pressure galley 100 and the actuators 124. Although only two hydraulic actuators 124 are shown, any number of hydraulic actuators are contemplated for use with the hydraulic system 80.

A valve 130, such as a relief valve, is positioned between the pressure galley 100 and the return line 102 to directly fluidly connect the pressure galley to the return line. The valve 130 may be variable position valve, e.g., as a proportional relief valve or an inverse proportional relief valve. In other examples, the valve 130 may be a fixed relief valve. The valve 130 position may be controlled via a solenoid in communication with the system controller 68. The valve 130 position may be controlled to control the pressure within the pressure galley 100. When the valve 130 is open, the flow from the pumps 82, 84 and the pressure galley 100 flows to the return line 102 and bypasses the actuators 124, and the pressure in the pressure galley 100 is minimized. When the valve 130 is closed, all of the flow is directed from the pumps 82, 84 to the pressure galley 100, to maximize pressure in the pressure galley 100. The position of the valve 130 may be controlled or modulated between open and closed positions, and partially open positions, to control the pressure within the pressure galley 100.

The hydraulic system 80 may have other components that are not shown, including other valves, actuators, filters, and the like.

The hydraulic system 80 may be used to consume electrical power from the battery 64 while the lift device 10 is braking via the electric motors 62 and when the voltage or other parameters associated with the motor controller 66, traction battery 64, or other power electronic devices are approaching their thresholds or limits according to the present disclosure. As the flow from the pumps 82, 84 increases and/or pressure in the system 80 increases, electrical power consumption by the hydraulic system 80 is also increased. For example, when high pressure fluid is metered through the relief valve 130, the power is dissipated as heat into the fluid. As the present disclosure provides for control over the speed and/or displacement of the pumps 82, 84, as well as control over the valve 130 position, the amount of electrical power dissipated by the hydraulic system 80 may be controlled as described below with respect to FIG. 5 to maintain operation of the lift device 10 within electrical limits and charging the traction battery 64 to the extent that it may be charged.

FIG. 5 illustrates a method 200 for controlling a lift device, such as the lift device 10 shown above with respect to FIGS. 1-4. In various examples, steps in the method 200 may be performed in a different order, performed in parallel or in series, and/or added or omitted. The method 200 may be implemented on the device 10, for example, via controller 68.

Various embodiments of the method 200 have associated, non-limiting advantages. For example, the method 200 and the device 10 control the speed of the vehicle when the device 10 is traveling on a non-zero grade or downslope to limit a speed increase or acceleration of the device as it travels down the grade, and prevent or delay engagement of the parking brake 70 and an abrupt stop for the device 10, especially at higher speeds.

As described above, while the device 10 is traveling down a non-zero grade, the traction motors 62 may need to act as generators and provide a braking torque to control the device 10 speed. As used herein, non-zero grade or grade indicates sloping terrain or an underlying surface that has a non-zero angle relative to horizontal or flat terrain. This may be especially true as the device 10 is without service brakes to control or reduce the vehicle speed while it descends the downslope. The electric motors 62 turn wheel torque and velocity into electrical power. At higher speeds, steeper grades and rapid decelerations for the lift device 10, the braking power required to maintain a vehicle speed or prevent acceleration may be greater than a braking torque available from the traction motors 62. The braking power of the electric motors 62 may depend on the motor 62 speeds and the battery 64 voltage. The torque that the motor 62 can produce is controlled or limited by its torque-speed curve. In this scenario, the device may accelerate down the grade, or exceed the commanded speed. Furthermore, and in one non-limiting example, the motors 62 are provided with a torque curve that provides high torque at low speed, and low torque at high speed, which may further limit motor 62 braking on a down grade.

Additionally, the braking torque generated by the traction motors 62 may be greater than a threshold or limit associated with the battery 64, motor controller 66, or another electrical component. The motor controller 66 may limit regenerative braking when the traction battery 64 voltage, state of charge, or other parameter is near a threshold to protect the battery 64 and/or the motor controller 66, and therefore braking via electric motors 62 may be limited under certain circumstances for the lift device 10. Likewise, when the device 10 has a lithium chemistry traction battery 64, the battery may have associated current and/or voltage thresholds.

As the lift device 10 is without service braking, the controller 68 would need to set the parking brake 70 if the device 10 is accelerating or exceeding the commanded speed or another upper speed threshold, which provides for a sudden stop for the device, as well as impacts drivability.

The present disclosure provides for a device 10 and the method 200 for controlling the device 10 as is descends a grade. The method 200 controls the device 10 to prevent motor 62 braking power from exceed any of a limitation set by the motor 62 or the battery 64, for example, when the device is traveling down a grade or slope. The method 200 reduces the travel speed of the device 10 before it encounters a situation where high braking power, or braking power at or near an upper limit occurs, for example, before the device 10 speed increases above the commanded or requested speed due to vehicle acceleration and an increased grade. This high braking power requirement may occur when stopping rapidly from a high speed on a steep grade. The drive speed of the device 10 is therefore reduced when travelling on a grade with the motor 62 torque required to maintain speed on the grade is limited to lower motor speeds.

Reducing the vehicle 10 speed allows the motor 62 to operate at a point on its torque curve where the motor 62 can make enough torque to control the device 10 speed. If the motor 62 cannot generate sufficient braking torque, the device 10 may exceed a commanded speed when descending a grade. The method 200 infers or determines the grade and reduces the speed of the device 10 before the grade gets too steep for the motor 62 to control the speed.

The method 200 starts at step 202, where it determines if the device 10 is operating. At step 204, the controller 68 determines if the device 10 speed is greater than a threshold value, or if the rotational speed of the traction motors 62 are greater than a threshold value.

At step 206, the method 200 determines if the device 10 is on a grade, or a downslope. The controller 68 may infer the grade based on sensors on board the device 10, or via signals received by the controller 68 from the motor controller 66. According to various examples, the controller 68 may determine or infer the grade as described below. The controller 68 is determining that the device is on a grade, and furthermore, that the device is moving in a downhill or downslope direction at step 206. Furthermore, and in some examples, the grade is greater than a threshold grade for the method 200 to proceed to step 208.

According to one non-limiting example, the controller 68 infers that the lift device 10 is on the grade based on an output torque of the electric motor 62 being applied in an opposite direction to a rotational speed of the electric motor 62. The controller may additionally infer that the device 10 is on a grade when the output torque of the electric motor 62 is greater than a predetermined torque value, or when the speed of the motor 62 or requested speed is above a predetermined speed. For example, the controller 68 may implement a predetermined limit as described at step 208 below in response to a motor speed and braking torque each being above a threshold value. The braking torque of the motor 62 is proportional to the slope angle of the grade. The controller 68 may therefore be further configured to infer the grade, e.g. a value for the grade, as being proportional to the output torque of the electric motor 62. The controller 68 may receive a signal from a torque sensor for the motor 62, or alternatively, may infer the torque for the motor 62, e.g. based on a lookup table, or by determining the torque from other motor parameters such as speed, voltage, current and temperature as provided by the motor controller 66.

According to another non-limiting example, the controller 68 receives a signal from a multi-axis accelerometer sensor 72 supported by the chassis 12, such as a mass-based multi-axis accelerometer sensor 72. The controller 68 may use the signal from the multi-axis accelerometer sensor 72 to infer the grade directly; however, the inferred grade may be inaccurate as the signal from the sensor 72 includes acceleration components as the device 10 is in motion.

According to another non-limiting example, the controller 68 receives a signal from a multi-axis accelerometer sensor 72 supported by the chassis 12, such as a mass-based multi-axis accelerometer sensor 72, and corrects the signal to infer the grade. In one example, the controller 68 corrects the signal to infer the grade by removing an acceleration component from the signal, with the acceleration component based on a change in rotational speed of one of the traction devices. The signal from the multi-axis accelerometer sensor 72 includes components for both the tilt of the device 10, which is indicative of grade, as well as accelerations or decelerations caused by movement of the device 10 as it is driven or operated. The signal from the sensor 72 may be corrected to infer the grade by removing the acceleration vector component from the signal to determine the vehicle tilt and grade. The acceleration vector component may be determined by taking a differential of the wheel 14 speed to determine the vehicle acceleration. The vehicle acceleration vector in the direction of travel is subtracted from the gravitational tilt vector in the tilt sensor signal to produce a corrected tilt vector. The corrected signal or corrected tilt vector, which is indicative of the grade, may be used to reduce the speed of the device 10 as described below.

According to yet another non-limiting example, the controller 68 receives a signal from a multi-axis accelerometer sensor, such as a mass-based multi-axis accelerometer sensor 72, supported by the chassis 12, and infers the grade by applying a filter to the signal. In one example, the controller 68 applies a filter that is modulated based on an acceleration component determined from a change in a rotational speed of one of the traction devices 14. For example, the signal filter may be variable to remove acceleration and deceleration effects from the sensor 72 signal such that the filtered vehicle tilt signal is minimally affected by vehicle acceleration, and is used to infer the grade. In a further example, the controller 68 applies an exponential filter, with the time constant for the filter being dependent on an acceleration component determined from a change in a rotational speed of one of the traction devices 14. The exponential filter may be a signal exponential filter according to one example.

As discussed above, the measure of tilt or grade for the device 10 using a mass-based multi-axis accelerometer sensor 72 is affected by a bias caused by angular acceleration as the device 10 is in motion. The angular acceleration includes both a longitudinal acceleration and a lateral acceleration component. As the vehicle 10 accelerates, the sensor 72 detects both varying linear and angular velocities at the same time, and the linear velocity varies at a faster rate than the angular velocity. However, the chassis 12 of the vehicle 10 cannot rotate at the higher rates induced by the linear acceleration of the wheels 14. The filter is applied to the signal to remove the components caused by the linear rate or linear acceleration from the overall rate, leaving the angular rate and velocity in the filtered signal. The slope-induced rotation rate of the device 10 may be determined from the filtered signal, which in turn, allows for the controller 68 to infer the grade.

For the signal, the bandwidth of the angular acceleration is lower than the linear acceleration. The filter for the signal is therefore modulated by the controller 68 to remove the higher frequency linear acceleration components from the signal when the vehicle 10 is accelerating. The filter modulation is based on the rate of linear acceleration, which may be determined from the wheels 14, or from a rate of change of the accelerometer. In one non-limiting example, the filter is a single exponential filter with a time constant that is modulated by the controller 68 as a function of the longitudinal chassis acceleration as determined from a wheel sensor or the traction motor, such that the filter is a dynamic filter. Furthermore, the time constant may vary as a function of the longitudinal chassis acceleration between two limits, and may vary linearly or non-linearly between the two limits. In another non-limiting example, the filter is a double exponential filter with two set time constants.

According to another example, the controller 68 receives a signal from using a mass-based multi-axis accelerometer sensor 72 with data related to the pitch or grade angle of the device 10 and later reduces the drive speed at step 208 when the grade angle approaches the a predetermined slope or grade angle associated with a torque limit for the electric motor 62 at the current speed of the motor 62. Furthermore, the controller 68 may further condition the signal from the sensor 72, for example, to reduce or prevent speed limiting events of the motor 62 associated with hysteresis. The signal conditioning by the controller 68 may include a variable time averaging of the signal, for example based on the acceleration of the device 10. The signal conditioning may additionally or alternatively include the controller 68 measuring a vehicle 10 acceleration vector in the direction of travel to correct the sensor vector by subtracting the measured vehicle acceleration vector from the gravitational tilt vector to produce a corrected tilt vector.

According to a further non-limiting example, the controller 68 receives a signal from a multi-inertial sensor supported by the chassis 12, with the signal from the sensor being indicative of the grade.

At step 208, the controller 68 limits the speed of the lift device 10 to a predetermined speed if the actual speed or requested speed is greater than the predetermined speed, and in response to and while the vehicle traveling down a grade as determined at step 206. The controller 68 may implement the predetermined speed limit via the speed control loop for the motor 62. The controller 68 may command the traction motors 62 to output a braking torque and provide electrical power to the traction battery 64 to limit or reduce the vehicle speed. By reducing the vehicle speed to the predetermined speed, a lower motor braking torque is required to slow or stop the vehicle, and therefore the motors 62 have a larger torque bandwidth to control the vehicle speed before reaching an upper torque limit or power limit for the motor 62.

The predetermined speed may be dependent on or based on the grade as determined at step 206. In one example, the predetermined speed is a function of the grade. In a further example, as the grade increases, the predetermined speed decreases. For example, different grade ranges may have an associated predetermined speed or speed zone, with a grade of zero to ten percent having a predetermined speed of that is 100% of the maximum speed for the selected mode, a grade of ten to twenty percent having a predetermined speed that is 50% of the maximum speed for the selected mode, and a grade of more than twenty percent having a predetermined speed that is 20% of the maximum speed for the selected mode. In another example, the grade ranges may have an associated predetermined speed that is set, e.g., with a grade of zero to ten percent having a predetermined speed of that is 100% of the maximum speed for the selected mode, a grade of ten to twenty percent having a predetermined speed that five miles per hour, and a grade of more than twenty percent having a predetermined speed that two miles per hour. In other examples, other grade percentage ranges, and or predetermined speeds or percentages may be used. In a further example, the predetermined speed may be calculated from a function or lookup table with the grade as an input, and with the predetermined speed continuously varying with grade.

Additionally, the lift device 10 may travel at a speed that is less than the predetermined speed at step 208. The controller 68 may recalibrate the speed associated with the joystick 50 end points, e.g. the full forward and reverse positions, to be the predetermined speed in each direction. The speed curve or request is likewise recalibrated between the neutral position and the end points of the joystick 50. Therefore, the vehicle 10 may be driven at less than the predetermined speed based on a position of the joystick 50 between the neutral position and full forward or full reverse.

At step 210, the controller 68 monitors a battery parameter, which may include a voltage of the motor controller 66, a voltage of the battery 64, a state of charge of the battery 64, a temperature of the battery 64, or another parameter associated with a power electronics device.

In response to the battery parameter being outside a predetermined range while the electric motor 62 is outputting the braking torque and providing electrical power to the traction battery 64, the controller 68 operates the hydraulic system 80 at step 212 by increasing a flow of the pumps 82, 84 and/or controlling the valve 130 to reduce a size of the valve opening and increase pressure in the pressure galley 100 thereby reducing electrical power to the traction battery 64. The pump 82, 84 flow and the size of the valve 130 opening may be controlled sequentially or concurrently.

By increasing flow of the pumps 82, 84 the pump motor 86 consumes electrical power from the traction battery 64, which in turn reduces electrical power to the traction battery 64 from the traction motors 62, and allows the traction motors 62 and motor controllers 66 to continue to generate braking torque and replace current that is discharging to the hydraulic system 80.

Likewise, reducing a size of the valve 130 opening and increasing pressure in the pressure galley 100 also reduces electrical power to the traction battery 64 as providing the higher pressure in the pressure galley 100 and dissipating the energy as heat across the relief valve 130 also consumes electrical power from the traction battery 64, which in turn reduces electrical power to the traction battery 64 from the traction motors 62 and allows the traction motors 62 and motor controllers 66 to continue to generate braking torque and replace current that is discharging to the hydraulic system 80.

Note that steps 210 and 212 are optional, and may be implemented on a lift device with an associated hydraulic system 80. Steps 210 and 212 are omitted for lift devices without a hydraulic system 80, and furthermore, may be omitted for vehicles with a hydraulic system depending on the predicted vehicle operating conditions and range for battery parameters.

At step 216, the controller 68 is configured to command the parking brake 70 to engage to stop the lift device 10 in response to the braking torque from the traction motors 62 being insufficient to maintain the lift device 10 at or below the predetermined speed while the lift device 10 is on the grade at step 214. The controller 68 is determining whether the traction motors 62 have enough torque bandwidth to control the device 10 speed to the predetermined limit. The controller 68 may set the parking brake 70 in response to a voltage in a motor controller 66 being above a threshold voltage while the electric motor 62 is outputting a braking torque and the speed of the lift device 10 is above the predetermined speed. Alternatively, the controller may set the parking brake 70 in response to the braking torque of the electric motor 62 being above a threshold, with the threshold dependent on an upper torque limit for the traction motor. In a further example, the controller 68 may set the parking brake in response to a motor 62 speed being greater than the predetermined speed, for example, greater than an offset above the predetermined speed that may indicate an overspeed.

At step 220, the controller 68 resets the end points for the joystick 50 or operator input to the maximum speed associated with the selected speed mode for the device 10 in response to the grade being below a predetermined grade at step 218, or in response to a braking torque being less than a threshold at step 218. This removes the predetermined limit for the speed from the device 10. The controller 68 may require the grade to remain below the predetermined grade or the braking torque to be less than the threshold across a time period at step 218 to limit hysteresis or cycling of the joystick 50 calibration.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure and invention.

What is claimed is:
1. A lift device comprising:
a chassis;

a lifting mechanism supporting a lifting platform relative to the chassis;

a plurality of traction devices to support the chassis on an underlying surface;

an electric motor drivingly coupled to at least one of the plurality of traction devices;

a traction battery in electrical communication with the electric motor;

a user input to control a speed of the lift device by inputting a requested speed; and a controller configured to, in response to the lift device being on a non-zero grade and if the requested speed is greater than a predetermined speed, command the electric motor to output a braking torque and provide electrical power to the traction battery, and limit the speed of the lift device to the predetermined speed.

2. The lift device of claim 1 further comprising a parking brake associated with at least one of the plurality of traction devices;

wherein the controller is configured to command the parking brake to engage to stop the lift device in response to the braking torque being insufficient to maintain the lift device at the predetermined speed while on the non-zero grade.

3. The lift device of claim 1 wherein the controller is further configured to command the electric motor to output the braking torque and limit the speed of the lift device to the predetermined speed if the speed of the lift device is greater than a threshold value.

4. The lift device of claim 1 further comprising a hydraulic circuit with a pump, a pressure galley, a return line, and a valve controlling pressure in the pressure galley and fluidly connecting the pressure galley to the return line; and a pump motor drivingly connected to the pump and in electrical communication with the traction battery;

wherein the controller is further configured to, in response to a battery parameter being outside a predetermined range while the electric motor is outputting the braking torque and providing electrical power to the traction battery, increase a flow of the pump and control the valve to reduce a size of the valve opening and increase pressure in the pressure galley thereby reducing electrical power to the traction battery.

5. The lift device of claim 4 wherein the hydraulic circuit has an actuator positioned to fluidly connect the pressure galley and the return line, the actuator coupled to the lifting mechanism.

6. The lift device of claim 1 wherein the plurality of traction devices is without a service braking system.

7. The lift device of claim 1 wherein the predetermined speed is dependent on the grade.

8. The lift device of claim 1 wherein the controller is further configured to infer that the lift device is on the non-zero grade based on an output torque of the electric motor being applied in an opposite direction to a rotational speed of the electric motor.

9. The lift device of claim 8 wherein the controller is further configured to infer the grade as being proportional to the output torque of the electric motor.

10. The lift device of claim 8 wherein the controller is further configured to infer the grade in response to the output torque of the electric motor being greater than a predetermined torque.

11. The lift device of claim 1 further comprising a multi-axis inertial sensor supported by the chassis;

wherein the controller is further configured to receive a signal from the multi-axis inertial sensor indicative of the grade.

12. The lift device of claim 1 further comprising a multi-axis accelerometer sensor supported by the chassis;

wherein the controller is further configured to receive a signal from the multi-axis accelerometer sensor, and infer the grade from the signal.

13. The lift device of claim 12 wherein the controller is further configured to determine the grade from the signal by removing an acceleration component based on a change in rotational speed of one of the traction devices.

14. The lift device of claim 12 wherein the controller is further configured to infer the grade by applying a filter to the signal.

15. The lift device of claim 14 wherein the filter is modulated based on an acceleration component determined from a change in a rotational speed of one of the traction devices.

16. The lift device of claim 14 wherein the filter is an exponential filter, and wherein a time constant for the filter is dependent on an acceleration component determined from a change in a rotational speed of one of the traction devices.

17. The lift device of claim 14 wherein the filter is a single exponential filter.

18. The lift device of claim 1 wherein the controller is further configured to, in response to the non-zero grade being less than a predetermined grade, remove the limit on the speed of the lift device.

19. A method of controlling a lift device, the method comprising:

receiving a requested speed for the lift device from a user input;

propelling the lift device at the requested speed via an electric motor connected to a wheel, the electric motor electrically connected to a traction battery;

determining that the requested speed is greater than a predetermined speed when the lift device is on a non-zero grade, the predetermined speed being dependent on the grade;

limiting a speed of the lift device to the predetermined speed by commanding the electric motor to output a braking torque and provide electrical power to the traction battery while the lift device is on the non-zero grade; and commanding a parking brake to engage to stop the lift device if the speed of the lift device exceeds the predetermined speed while on the non-zero grade.

20. A propulsion device comprising:

an electric motor adapted to be coupled to at least one wheel;

a traction battery in electrical communication with the electric motor;

a user input to control a speed of the at least one wheel by inputting a requested speed; and a controller configured to, in response to the device being on a non-zero grade and if the requested speed is greater than a predetermined speed, command the electric motor to output a braking torque and provide electrical power to the traction battery, and limit the speed of the device to the predetermined speed.

* * * * *